United States Patent [19]

Flindall

[11] Patent Number: 5,149,555
[45] Date of Patent: Sep. 22, 1992

[54] METHOD FOR FORMING AN OPEN TEXTURED PRODUCT

[75] Inventor: Richard C. Flindall, Brighton, Canada

[73] Assignee: Kraft General Foods Canada Inc., Don Mills, Canada

[21] Appl. No.: 481,420

[22] Filed: Feb. 16, 1990

Related U.S. Application Data

[63] Continuation of Ser. No. 353,986, May 18, 1989, abandoned.

[51] Int. Cl.$^5$ .......................... A23L 1/18; A23P 1/12; A23P 1/14
[52] U.S. Cl. .................................. 426/448; 426/449; 426/516
[58] Field of Search .............. 426/447, 448, 449, 516; 264/45.9, 46.1, 55

[56] References Cited

U.S. PATENT DOCUMENTS

| | | | |
|---|---|---|---|
| 2,915,957 | 12/1959 | Bowman | 425/382.3 |
| 3,104,975 | 9/1963 | Bowman | 425/382 R |
| 3,605,649 | 9/1971 | Bundus | 425/97 |
| 3,664,779 | 5/1972 | Bundus | 424/4 |
| 3,857,914 | 12/1974 | Aishima et al. | 264/45.5 |
| 3,941,544 | 3/1976 | Barth | 425/376 |
| 3,966,381 | 6/1976 | Suh | 425/376 |
| 4,082,488 | 4/1978 | Brinkschroder et al. | 425/204 |

FOREIGN PATENT DOCUMENTS

| | | | |
|---|---|---|---|
| 2844006 | 10/1980 | Fed. Rep. of Germany | 264/45.9 |
| 51-30870 | 3/1976 | Japan | 425/203 |
| 2041717 | 9/1980 | United Kingdom | 426/448 |

Primary Examiner—Arthur L. Corbin
Attorney, Agent, or Firm—Linn I. Grim

[57] ABSTRACT

Apparatus and method for forming an open textured food product, comprising an extruder and an extruder die. The extruder is provided to receive an extrudable food material, to advance that material longitudinally forward while heating and pressurizing the food material, and to force the heated and pressurized food material outward through an extruder outlet. The extruder die is connected to the extruder immediately forward of the extruder outlet, and the die forms an inlet to receive the pressurized food material from the extruder outlet, an expansion chamber to receive the pressurized food material from the extruder die inlet wherein the food material expands to a predetermined width, and an outlet to discharge the expanded food material from the extruder die. The expansion chamber laterally extends at least substantially to that predetermined width immediately forward of the extruder die inlet so that as the food material expands in the expansion chamber, an open texture is formed throughout the interior of the expanded material and the food material is expanded into a self-maintaining shape.

5 Claims, 1 Drawing Sheet

METHOD FOR FORMING AN OPEN TEXTURED PRODUCT

This is a continuation of application Ser. No. 353,986, filed May 18, 1989, now abandoned.

BACKGROUND OF THE INVENTION

This invention generally relates to methods and apparatus for extruding food products, and more specifically to methods and apparatus for forming a food product with an open texture throughout the interior of the product but also having a smooth exterior surface.

Small bread- or crouton-like bits of food may be made by extruding a suitable food material, such as a cereal meal, into a long rope, tempering the rope to form an open texture inside the rope, and then cutting the rope into slices or pieces. These food bits resemble tiny slices of bread in that they, first, have an open texture throughout the interiors of the food bits and on the front and back faces that are formed when the individual slices are cut from the rope, and second, have a smooth skin or surface extending around the outside of the product, between those front and back faces.

The standard dies used in the above-described procedure determine the product shape, but these dies normally do not allow for the formation of the desired open texture in the interior of the extruded product, and instead a separate tempering and cutting step is needed to provide that texture.

In accordance with the present invention, it has been learned that by immediately expanding an extruded food material to, or at least substantially to, its final width as soon as that food material enters an expansion chamber of an extruded die, an open texture can be formed throughout the interior of the expanded food material, while at the same time, the food material can consistently be expanded into a product that will maintain its own shape after the product is discharged and sliced from the extruder die.

PRIOR ART

Numerous dies have been used to form extruded food materials or similar products into various shapes. For example, such dies are shown in U.S. Pat. Nos. 4,438,146; 4,240,779; 4,171,668; 4,171,401; 4,128,372; 4,127,376; 3,876,743; 3,605,649; and 3,291,032.

U.S. Pat. No. 4,438,146 discloses an apparatus and method for the preparation for a wheat product wherein dough primarily comprising ground wheat and moisture is mixed at ambient temperature and then extruded through a restricted die to effect cooking to steam conditions whereby expansion of the wheat product is achieved upon exiting from the die. The disclosed dies comprise a plurality or a multitude of consecutive disc shaped plates, each having a multitude of holes or slots. These dies do not have or form any type of expansion chamber in which the extrudable food material is immediately expanded into or at least substantially to its final width upon entry into the expansion chamber. Moreover, the method and apparatus disclosed in this reference are not used to form an extrudable food product into a self-maintaining shape.

U.S. Pat. No. 4,240,779 discloses a block diagram of a food shaping device including an extruder. This reference is principally directed to a cutting device used to cut the material extruded from the die, and the die itself is not described or illustrated in detail.

U.S. Pat. Nos. 4,171,668 and 4,127,376 disclose a method and apparatus for forming a proteinaceous mass into a fibrous and layered structure. With this apparatus, a die is located adjacent the outlet of the extruder so that the die and the extruder outlet form an annular slot and a disc-shaped space radially extending outward from that annular slot. Material is discharged from the extruder, through this annular slot and then into this disc-shaped space.

U.S. Pat. No. 4,171,401 discloses a method and apparatus for manufacturing artifical straw. Chips of a polymeric material are treated and then extruded through a die to form long, thin ropes, which are then cooled, pressed and further shaped to form the artificial straw. This reference discusses in detail various techniques for treating the polymeric chips, and numerous parameters of the manufacturing process. However, the reference does not discuss in detail any specific extruder die.

U.S. Pat. No. 4,128,372 discloses a method and apparatus for extruding dough into an assortment of characters such as letters of the alphabet, numerals or related but dissimiliar shaped pieces such as animal forms. The extrusion die assembly disclosed in this reference consists of a cylindrical die plate having a plurality of die inserts or plugs mounted therein. This die assembly is not utilized to expand a food product or to form a food product having an open texture; but instead the die disclosed in this reference is used to restrict or confine the food material passing through the die.

U.S. Pat. No. 3,876,743 discloses a process and apparatus for making a composite extruded food product of generally cylindrical configuration and having the appearance of a plurality of helically arranged or twisted stripes of alternating contrasting colors, flavors, textures or other characteristics. To make this product, first and second batches of food material are fed under pressure to respective bores of an extruder die. These bores of the extruder die converge toward a common axis but are skewed or offset or all set about that axis so as to impart a helical configuration to the strand components of the composite extrudate.

U.S. Pat. No. 3,605,649 discloses an extruder for making expanded puffed snacks. With this extruder, a food material is passed in sequence through a shaping portion, an expanding portion and a stabilizing portion of a bore in a die plate. As the food material passes through the shaping portion of the bore, that material is shaped without expanding, and the food material gradually expands as it passes through the expanding portion of the bore. As the expanded food material passes through the stabilizing portion of the bore, the shape of the food material is stablized, and that material is wiped with coloring and flavoring. This reference actually teaches away from the present invention in that this reference teaches expanding the food material gradually as it passes through the extruder die. In contrast, with the present invention, the extrudable food material is immediately expanded at least substantially to its final width after entering an expansion chamber of an extruder die.

U.S. Pat. No. 3,291,032 discloses an apparatus for producing puffed cereal products such as puffed corn and rice sticks or collects. With this apparatus, cereal meal is extruded through a restricted die; and upon contact with the atmosphere, the cereal meal expands and solidifies. FIGS. 3 through 8 of this reference disclose a multitude of specific dies that may be used with the extruder apparatus. In all of these dies, the extruded material is forced through a forwardly inwardly tapering conical passage and then either discharged into the atmosphere or conducted through a cylindrical passage having a uniform diameter. None of these dies includes an expansion chamber in which the extruded material expands to at least substantially its final width immediately upon entering the expansion chamber.

U.S. Pat. No. 3,272,110 discloses a device for processing or puffing materials such as cereal dough bodies, and in particular, a noise suppressing and food recovery mechanism for use with such a device. This noise suppression mechanism includes a cylindrical nozzle expansion section, however this expansion section is not used as an extruder die.

SUMMARY OF THE INVENTION

The present invention is an apparatus and method for forming an open textured food product, comprising an extruder and an extruder die. The extruder is provided to receive an extrudable food material, to advance that food material forward while heating and pressurizing the food material, and to force the heated and pressurized food material outward from the extruder through an extruder outlet. The extruder die is connected to the extruder immediately forward of the extruder outlet; and the die forms an inlet to receive the pressureized food material from the extruder outlet, an expansion chamber to receive the pressurized food material from the extruder die inlet and wherein the food material expands to a predetermined width, and an outlet to discharge the expanded food material from the extruder die. The expansion chamber laterally extends at least substantially to that predetermined width immediately forward of the extruder die inlet, so that as the food material expands in the expansion chamber, an open texture is formed throughout the interior of the expanded material and the food material is expanded into a self-maintaining shape. A knife or other cutting member may be located immediately forward of the extruder die outlet to cut or slice the product discharged therefrom to form finger or pellet like food products.

DETAILED DESCRIPTION OF THE PREFERRED EMBODIMENTS

Figure 1:
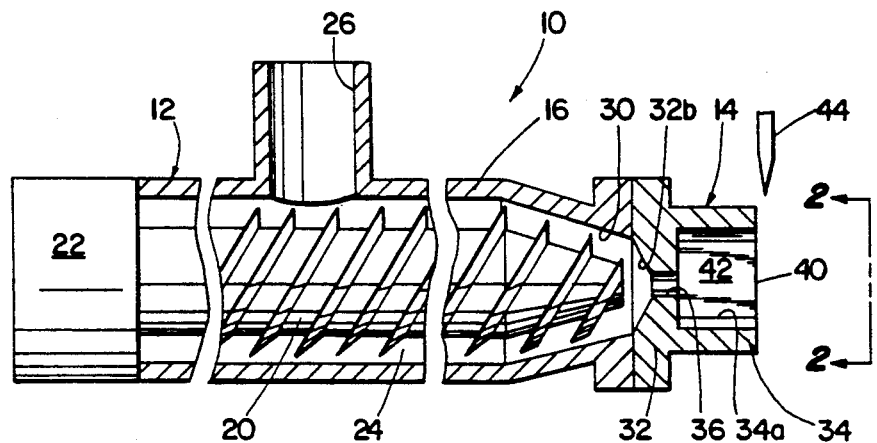
FIG. 1 illustrates an apparatus for forming an open textured food particle according to this invention.

FIG. 1 illustrates apparatus 10 generally comprising extruder 12 and extruder die or nozzle 14. Extruder 12 includes body 16, extruder screw 20 and screw drive means 22; and body 16 in turn, defines extruder passageway 24, extruder inlet 26 and extruder outlet 30. Extruder die 14 includes back wall portion 32 and side wall portion 34; and this back wall portion forms die inlet 36, the side wall portion forms a forward die outlet 40, and the back and side wall portions together form expansion chamber 42.

Extruder 12 is provided, generally, to receive an extrudable food material, to advance that material longitudinally forward while heating and pressurizing the food material, and to discharge the heated and pressurized food material through extruder outlet 30. Any suitable extruder, or corresponding device, may be employed in the practice of the present invention, and many common acceptable extruders are known to those skilled in the art.

With the embodiment of extruder 12 shown in FIG. 1, an extrudable food material is fed into extruder passageway via inlet 26. Extruder screw 20 is rotatably supported in passageway 24; and drive means 22, which may for example be an electric motor, is operatively connected to the extruder screw to rotate that screw and advance the food material forward through passageway 24, from inlet 26, to and through extruder outlet 30. As the food material moves forward through passageway, that material is both heated and pressurized so that a substantially gelatinized and cooked food material is discharged through extruder outlet 30.

It will be understood that FIG. 1 shows a very simplified extruder 12, and that in practice it may be helpful or preferred to provide the extruder with additional elements to obtain the desired or optimum performance. For example, screw extruders of the type illustrated in FIG. 1 typically include one or more bearing assemblyies supporting screw 20 for rotation within extruder body 16, one or more seals to prevent food material leaking from passageway 24 through various interfaces or openings in the extruder body, and a drive connection or transmission between drive means 22 and screw 20. For the sake of simplicity, these parts have been omitted from FIG. 1.

Also, extruder body 16 may form a water inlet to conduct hot water into passageway 24 to help control the moisture content and temperature of the food material passing therethrough, and the extruder may be provided with one or more water jackets to cool the extruder or various portions thereof. Extruder 12 may include a pair of parallel screws disposed in passageway 24 to advance food material therethrough; and means, such as still another screw, may be used to help conduct the food material through extruder inlet 26 and into passageway 24 at a desired or predetermined rate. Moreover, depending on the extent to which it is desired to heat and pressurize the food material conducted through extruder 12, inlet 26 may be located closer to or further from extruder outlet 30. The above-discussed modifications or additions to the extruder 12 shown in FIG. 1 are all within the ability of those of ordinary skilled in the art.

Extruder die 14 is connected to extruder 12 immediately forward of extruder outlet 30, and the pressurized food material discharged from the extruder is conducted through die inlet 36 and into expansion chamber 42. The pressure in expansion chamber 42 is at or near atmospheric pressure; and thus as food material is forced into the expansion chamber, the pressure of the food material significantly decreases. This causes the food material to expand and solidify, forming a rather brittle, elongated finger-like product. As this is occurring, small spaces that are themselves void of the food material form within the expanding product, producing what is referred to as an open texture. In addition, as the food material expands and moves forward in expansion chamber 42, that food material is forced against side wall portion 34, which in turn forms a smooth skin or surface on the expanding product.

Figure 3:
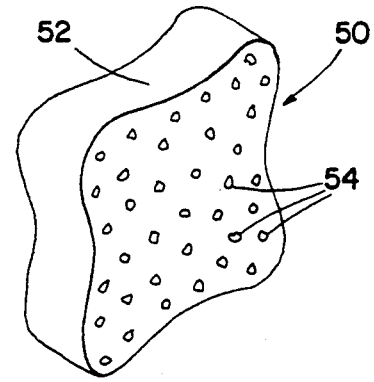
FIG. 3 is a perspective view of a food particle made with the apparatus of FIG. 1.

A knife or other suitable cutting means, shown at 44 in FIG. 1, intermittantly passes die outlet 40 to sever the finger-like product discharged from extruder die 14, and the speed of this knife or cutting means can be varied to produce finger or pellet like products of various depths. One of these food products is shown at 50 in FIG. 3; and the smooth outside surface or skin of the product is referenced at 52, while the above-mentioned spaces in the product that are void of the food material itself are referenced at 54.

In accordance with the present invention, it has been learned that by immediately expanding the food material to, or at least substantially to, its final width as soon as the food material enters expansion chamber 42, an open texture can be formed throughout the interior of the expanded food material, while at the same time, the food material can consistently be expanded into a product that will maintain its own shape after the product is discharged and sliced from extruder die 14. To allow for this immediate expansion of food material, expansion chamber 42 laterally extends outward at least substantially to, and preferably completely to, its maximum width immediately forward of die inlet 36.

More specifically, back wall portion 32 of the extruder die 14 includes a substantially planar front surface 32a, and die inlet 36 is formed in this planar surface. Also, side wall portion 34 of extruder die 14 includes an inside surface 34a that, first, extends around and transversely bounds expansion chamber, and second, extends forward from back surface perpendicular thereto. As described above, expansion chamber 42 has the shape of a right cylinder, and preferably the central axis of die inlet 36 is colinear with the central axis of the expansion chamber.

Preferably, inside surface 34a of side wall portion 34 is smooth so that, as expanded food material is forced forward and outward through the extruder die, a smooth surface is formed around the outside of that expanded food material. In addition, preferably back wall portion 32 includes a back surface 32b that extends over extruder outlet 30 and that slants forwardly inwardly to die inlet 36 to guide food material thereinto.

Figure 2:
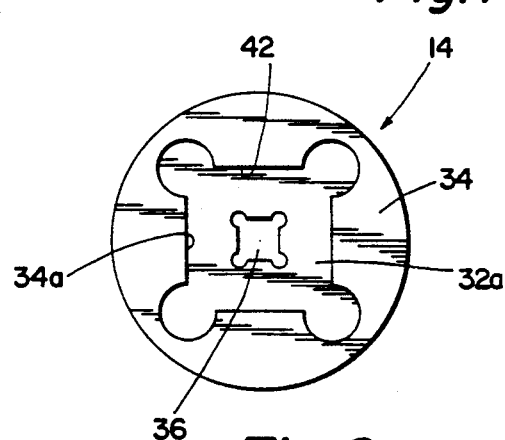
FIG. 2 is a front view of the extruder die of the apparatus shown in FIG. 1, taken along line II—II thereof.

With the embodiment of extruder die 14 shown in FIGS. 1 and 2, die inlet 36 has a square cross section with a width preferably in the range from about 0.140 to about 0.20 inch, more preferably 0.156 inch and the front surface 32a of back wall portion 32 has a square shape with a width preferably about 0.400 to about 0.600 inch, more preferably about 0.500 inch. Moreover, die inlet 36 has a length approximately 0.156 inch or greater, the inside surface 34a of side wall portion 34 has a length of about 0.400 to about 0.600 inch preferably 0.500 inch, and back surface 32b of back wall portion 32 slants forwardly inwardly at an angle approximately 11° relative to front surface 32a of the back wall portion. Moreover, the total length of the extruder die can range from about 0.500 to about 0.850 inch preferably 0.750 inch.

It is believed that the height and width of die inlet 36 could be increased or decreased up to approximately 20% and still produce similar results in product form. The length of die inlet 36 could be increased up to approximately 0.312 inch; however, because of the high pressures involved, this length, which is also the minimum thickness of back wall portion 32, preferably is not decreased below approximately 0.156 inch. It is further believed that the length of expansion chamber 42 could be between twice as long and half as long as the above-given length (that is, between 0.250 inch and 1.000 inch), and still produce acceptable results. However, increasing the length of inside surface 34a tends to affect adversely the food product definition because of the need to release steam from around the extrudate in expansion chamber 42.

Extruder die 14 may be connected to extruder 12 in any suitable way. For example, as shown in FIG. 1, die 14 may be provided with an outside radial flange adapted to seat against a front radial flange of extruder body 16, and these two flanges may be bolted together to hold the extruder die securely on the extruder body. Alternatively, a suitable clamping mechanism (not shown) may be used to connect die 14 to extruder body 16.

In operation, a suitable food material such as a cereal meal, is supplied to passageway 24 via extruder inlet 26, and screw 20 is rotated to advance the cereal meal forward through extruder 12 and through extruder die 14. As the meal is forced toward die 14, the restriction created by the die increases the pressure of screw 20 on the meal, heating the meal sufficiently to vaporize the moisture and gelatinize the starch in the meal. For example, the cereal meal may be discharged from extruder 12 at a pressure between 50 and 2000 psi and at a temperature between about 130° C. and 190° C., and more preferably, at a pressure between 900 and 1200 psi and at a temperature between approximately 160° and 180° C. If cereal meal is used as the extrudate, then preferably the temperature of the material is about 170° C.

The fluent material thus formed is forced through die inlet 36 with increasing temperature and pressure, and upon contact with the atmosphere in expansion chamber 42, the fluent material expands and solidifies. The solidified finger-like product is forced forward through die outlet 40 and cut into slices or pieces of the type shown in FIG. 3.

As will be evident, a large variety of food materials, and specifically cereals, may be used in the practice of this invention, and these, depending upon their individual properties, such as their moisture content, starch content, and specific gravity, may require the use of varying conditions for optimum results. The method and apparatus of the present invention may also be used to process products other than cereal products; and, for instance, the invention may be used with corn, rice, albeto, wheat and potato.

Figure 4:
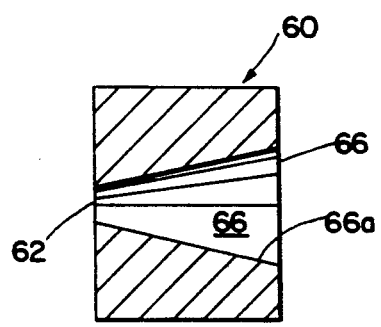
FIG. 4 illustrates a prior art extruder die which was tested for purposes of comparision.

It is believed that the benefits of the present invention may be best understood by comparing the food product obtained by employing the apparatus and method of the present invention with the food product that was obtained by extruding food material, under conditions similar to those described above, through an extruder die having a conically shaped expansion chamber as described in U.S. Pat. No. 3,605,649. FIG. 4 illustrates such an extruder die 60 having inlet 62, outlet 64, and a conically-shaped controlled expansion chamber 66. More specifically, inlet 52 has a square cross-section with a width of 0.156 inch, the length of the prior art die is 0.750 inch, and interior surface 66a slopes at an angle of approximately 13° relative to the axis of the die.

Figure 5:
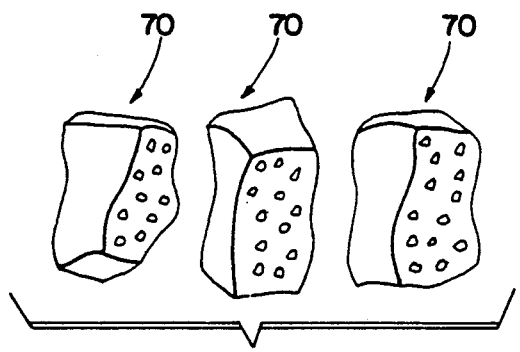
FIG. 5 shows several food particles extruded from an apparatus employing the die of FIG. 4.

In use, heated and pressurized food material was forced through die inlet 62 and into expansion chamber 66, wherein the food material gradually expanded to its maximum width; and the expanded food product was discharged via die outlet 64, and then cut into pieces. Several of these pieces are shown at 70 in FIG. 5; and with reference thereto, it was found that with die 60, the extruded food material would not consistently expand into a single, pre-determined, self-maintaining shape, but instead, pieces sliced from the material discharged from the extruder die had various widths, lengths and shapes.

While it is apparent that the invention herein disclosed is well calculated to produce the desired open textured food product, it will be appreciated that numerous modifications and embodiments may be devised by those skilled in the art, and it is intended that the appended claims cover all such modifications and embodiments as fall within the true spirit and scope of the present invention.

What is claimed is:

1. A method of forming an open textured food product having a predetermined, uniform width comprising:
   conducting an extrudable food material under pressure into an expansion chamber defined by an extruder die;
   immediately expanding the food material to the same shape as the desired shape of the finished product and expanding said food material to said final predetermined uniform width upon entry of the food material into the expansion chamber to form an open texture throughout the interior of the expanded material while expanding the food material to a self-maintaining shape;
   guiding the expanded food material forward through the expansion chamber, along a smooth inside surface of the extruder die, to form a smooth outside surface on the expanded food material;
   discharging the expanded food material from the extruder die; and
   cutting the discharged food material into individual pieces.

2. A method according to claim 1 wherein the extruder die has an inlet to conduct the food material into the expansion chamber, the expansion chamber has the shape of a right cylinder and extends forward from the inlet of the extruder die, and the step of immediately expanding the food material includes the step of expanding a portion of the food material in a direction perpendicular to the inlet of the extruder die immediately upon entry of said portion of the food material into the expansion chamber.

3. A method according to claim 2, wherein the step of immediately expanding the food material further includes the step of completely filling the expansion chamber with the extrudable food material as it is expanding.

4. A method according to claim 3 wherein:
   the expansion chamber defines a central axis; and
   the step of conducting the extrudable food material into the expansion chamber includes the step of conducting the extrudable food material into the expansion chamber along said central axis.

5. A method according to claim 4 wherein:
   the extruder die includes a back surface slanting forwardly inwardly to the inlet of the extruder die, and the step of conducting the extrudable food material into the inlet of the extruder die further includes the step of conducting the extrudable food material along said back surface and then into said inlet.

* * * * *